United States Patent
Kim (10) Patent No.: US 7,313,085 B2
(45) Date of Patent: Dec. 25, 2007

(54) METHOD FOR CREATING SYMMETRIC-IDENTICAL PREAMBLE AND METHOD FOR SYNCHRONIZING SYMBOL AND FREQUENCY OF ORTHOGONAL FREQUENCY DIVISION MULTIPLEXED SIGNALS BY USING SYMMETRIC-IDENTICAL PREAMBLE

(75) Inventor: Kwang-Chul Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1004 days.

(21) Appl. No.: 10/191,801

(22) Filed: Jul. 10, 2002

(65) Prior Publication Data

US 2003/0072256 A1    Apr. 17, 2003

(30) Foreign Application Priority Data

Aug. 20, 2001 (KR) ............... 2001-50104

(51) Int. Cl.
  *H04J 11/00* (2006.01)
(52) U.S. Cl. .............. 370/208; 370/210; 370/281; 375/260
(58) Field of Classification Search .......... 370/281, 370/295, 512–514; 375/335, 364
See application file for complete search history.

(56) References Cited

U.S. PATENT DOCUMENTS 5,732,113 A * 3/1998 Schmidl et al. .......... 375/355
6,658,063 B1 * 12/2003 Mizoguchi et al. ......... 375/260
6,731,594 B1 * 5/2004 Bohnke ................ 370/208
6,738,443 B1 * 5/2004 Bohnke et al. ........... 370/514

FOREIGN PATENT DOCUMENTS

KR    2001-0105898    11/2001

OTHER PUBLICATIONS

The 2001 International Technical Conference on Circuits/Systems, Computers and Communicates vol. 1 Published Jul. 10, 2001.
A Fast Synchronization for OFDM Applications using a Symmetric-Identical Preamble published Jul. 10, 2001.

* cited by examiner

*Primary Examiner*—Doris H. To
*Assistant Examiner*—Ian N. Moore
(74) *Attorney, Agent, or Firm*—Sughrue Mion Pllc.

(57) ABSTRACT

A method for synchronizing symbol timing and frequency of symmetric-identical (SI) Orthogonal Frequency Division Multiplexed signals (OFDM) wherein an SI preamble is used for calculation of the symbol timing and frequency synchronism offset of the OFDM signals out of the samples of the received signals is provided. The SI preamble includes a first sample group and a second sample group, being alternately arrayed several times, in which the first sample group includes a designated number of samples that are arrayed in order of arrival, while the second sample group includes the same number of samples with the first sample group, but in inverse order of arrival. Because distinctive correlation coefficients of the identical samples are very distinctive from each other, it is possible to estimate a starting point of the OFDM symbol more precisely. Using the SI preamble, both symbol synchronism and a fine frequency offset and a coarse frequency offset can be estimated. Moreover, the transmission efficiency and the overall capacity of the OFDM system are greatly improved.

5 Claims, 10 Drawing Sheets

METHOD FOR CREATING SYMMETRIC-IDENTICAL PREAMBLE AND METHOD FOR SYNCHRONIZING SYMBOL AND FREQUENCY OF ORTHOGONAL FREQUENCY DIVISION MULTIPLEXED SIGNALS BY USING SYMMETRIC-IDENTICAL PREAMBLE

BACKGROUND OF THE INVENTION

1. Field of the Invention

The present invention relates to a method for creating symmetric-identical preamble of Orthogonal Frequency Division Multiplexed signals and a method for synchronizing symbol and frequency of OFDM signals by using the symmetric-identical preamble. More particularly, the present invention relates to a method for creating symmetric-identical preamble of OFDM signals and for synchronizing symbol and frequency of OFDM signals by using the created symmetric-identical preamble, and a method for synchronizing symbol and frequency of OFDM signals by using the symmetric-identical preamble.

2. Description of the Related Art

Orthogonal Frequency Division Multiplexing (hereinafter, it is referred as OFDM) is a very effective way to transmit data through a channel. In order to transmit the data, OFDM uses a plurality of sub-carrier frequencies within a channel bandwidth. Such sub-carrier frequencies are allocated bandwidth to maximize the efficiency of bandwidth better than other conventional methods, such as, Frequency Division Multiplexing (FDM), so that they can avoid inter-carrier interference (ICI) very well. Moreover, coating the sub-carrier frequencies with the data reduces any further loss due to frequency-selective fading, and brings more advantages of frequency diversity.

In the OFDM system the frequency offset and synchronizing symbol should be considered to properly demodulate transmitting signals. If the starting point of the symbol is not properly detected, the inter-symbol interference (ISI) occurs, and the transmitting signals cannot be restored well. In general, the starting point of the symbol is found using a correlation value coefficient between the receiving signals. At this time, a specific signal of a specific preamble is applied in order to obtain the correlation value.

The conventional method for synchronizing symbol and frequency of OFDM signals is illustrated with reference to FIG. 1 through FIG. 4.

Figure 1:
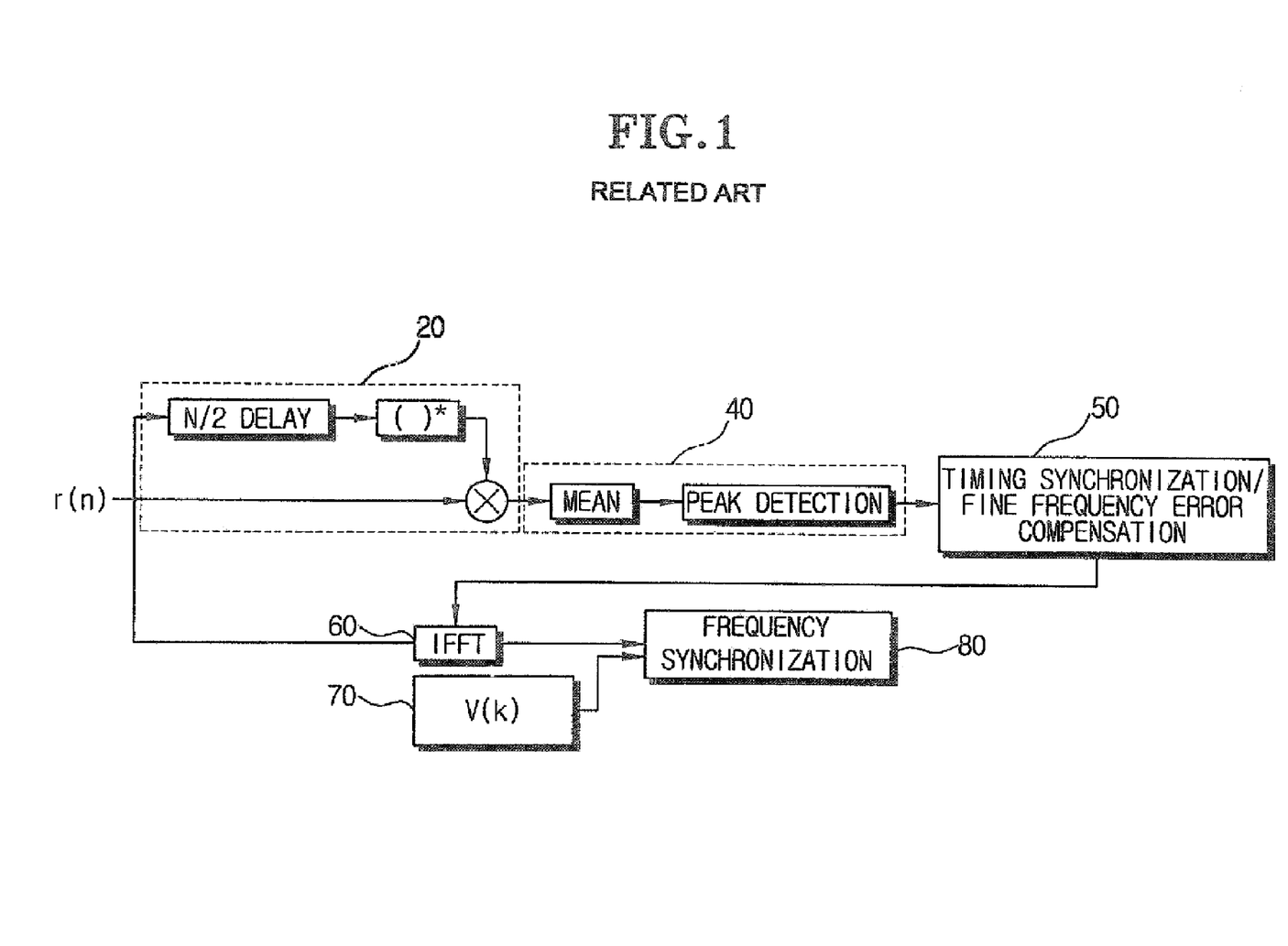
FIG. 1 is a block diagram illustrating a conventional receiving set of Orthogonal Frequency Division Multiplexed signals.

FIG. 1 is a block diagram of a conventional OFDM signal receiving set suggested by Schimidle.

Referring to FIG. 1, the OFDM receiver receives data, r(n), through a RF (radio frequency) receiver (not shown). Then, the received OFDM signals are inputted to the self-correlation unit (20) to restore baseband data bit. The self-correlation unit (20) delays the received data, r(n), as long as a half of the OFDM symbol length (N), or N/2. The self-correlation unit (20) also calculates a delayed signal, r*(k-D) and a self-correlation value of the received signals, r(n).

Peak detection unit (40) calculates the mean of N/2 self-correlation values, and detects a maximum of the mean values that are obtained per sample. Time/Frequency synchronization unit (50) obtains a time domain synchronization based on the maximum mean value that is detected. After the precise symbol synchronization in the time domain is obtained, the frequency offset problem should be solved next.

The frequency offset often occurs when the generator of a receiver is inaccurate. The frequency offset perverts the amplitude and phase of the demodulate signals, and causes inter-sub channel interference that consequently deteriorates the entire capacity of the OFDM system. Normally, the frequency offset is divided into a coarse frequency offset and a fine frequency offset.

The time/frequency synchronization unit (50) estimates and compensates the fine frequency offset of the sub-carrier using a guard interval in the time domain. In order to compensate the coarse frequency offset, the signal that the fine frequency offset of the sub-carrier is compensated, and the received signal r(n), go through the inverse Fourier transformation at IFFT (Inverse Fast Fourier Transform) unit (60).

The correlation values between the inverse Fourier transformed signals and N differential signals v(k) are calculated, and the mean of the correlation values are obtained in order to detect the maximum correlation values in each sample. The coarse frequency synchronization unit (80) obtains an integral frequency synchronization from the detected maximum values.

Figure 2:
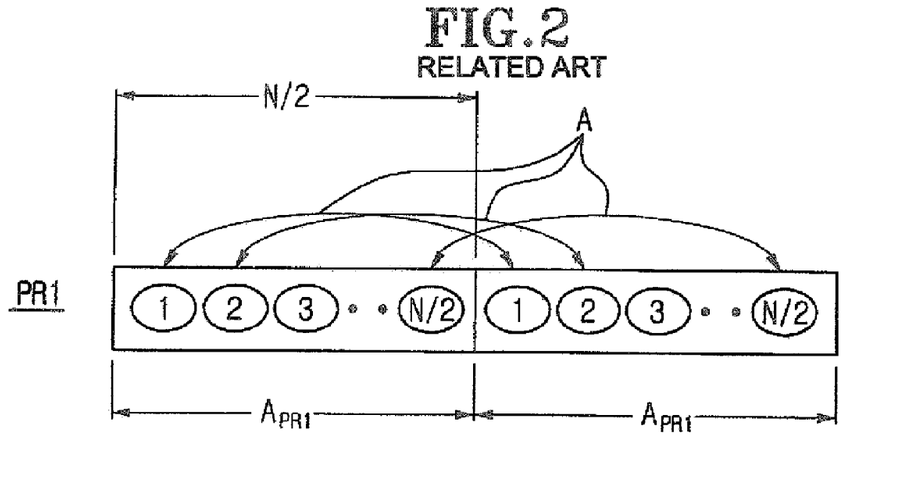
FIG. 2 is a diagram illustrating a preamble (PR1) structure of OFDM signals suggested by Schimidle in accordance with the conventional method.

FIG. 2 is a diagram illustrating a structure of the conventional preamble (PR1) of OFDM signals suggested by Schimidle.

As shown in FIG. 2, the preamble (PR1) for calculating OFDM signals offset using the conventional method suggested by Schimidle includes N number of samples, and, the identical sample layer is arrayed at intervals of N/2. That is, the preamble (PR1) for calculating the offset has the structure of $[A_{PR1}, A_{PR1}]$, and the distance between the same sample layers is N/2 for all. The arrow A in FIG. 2 indicates the correlation between the samples with the correlation coefficients to be calculated.

The self-correlation unit (20) calculates a N/2 delayed signal and a self-correlation value in every sample, and then outputs them to the peak detection unit (40).

Suppose that there are 64 sub-carriers, and the experiment was conducted in the surroundings of additive white Gaussian noise (AWGN) at 5 dB. Here, although the self-correlation value is expected to have the maximum value at the $64^{th}$ sample, the truth is that a greater correlation coefficient is obtained around the $64^{th}$ sample. This means that the error rate in symbol timing synchronism around the sample where the maximum value is supposed to exist is considerably high due to other noises and influences of the channel.

Supposing that the precise starting point is found when m is zero in Formula 1 for correlation coefficients, the correlation metric P(d), can be expressed as follows in the case that the d sample is offset.

$$P(d) = \left| \sum_{n=0}^{\frac{N}{2}-1} r(n+d)r^*\left(n+d+\frac{N}{2}\right) \right|^2 \qquad \text{[Mathematical Formula 1]}$$

$$= \left| \sum_{n=0}^{\frac{N}{2}-1-d} r(n+d)r^*\left(n+d+\frac{N}{2}\right) + \sum_{n=\frac{N}{2}-d}^{\frac{N}{2}-1} r(n+d)\hat{r}\left(n+d+\frac{N}{2}\right) \right|^2$$

where d is the number of samples that are offset.

Because the receiving signals r(n+d) and $$\hat{r}\left(n+\frac{N}{2}+d\right)$$

belong to different symbols respectively, there should be no correlation between them. However, in the Formula 1, r(n+d) and $$\hat{r}\left(n+\frac{N}{2}+d\right)$$

correlates each other. Therefore, if the number of samples that are offset is small, it is very difficult to distinguish the precise symbol starting point from the correlation value.

On the other hand, the conventional method for synchronizing symbol and frequency of OFDM signals using preamble (PR1) suggested by Schimidle uses the absolute values for calculating the correlation metric P(d). Accordingly, when AWGN is included in the samples that are offset, the maximum correlation value is found around the actual starting point of the symbol.

As for estimating the frequency offset, however, since the conventional method for synchronizing symbol and frequency of OFDM signals using preamble (PR1) suggested by Schimidle has the constant sample interval, i.e., N/2, the fine frequency offset and the coarse frequency offset should be estimated separately.

Figure 3:
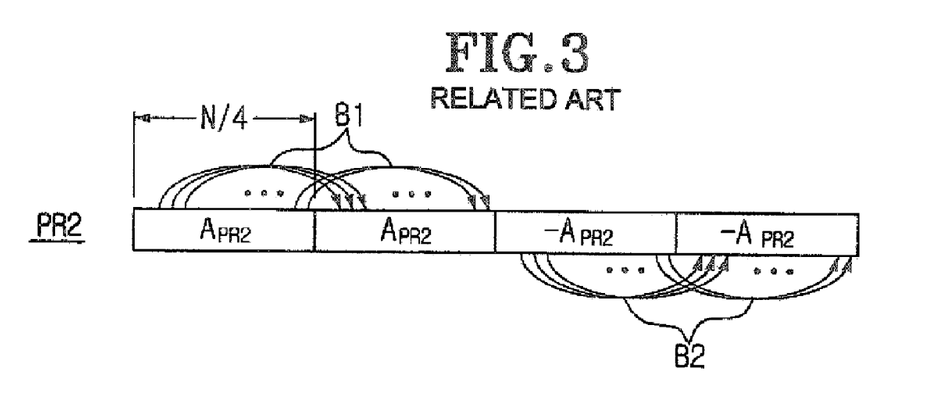
FIG. 3 is a diagram illustrating a preamble (PR2) structure of OFDM signals suggested by Minn in accordance with the conventional method.

FIG. 3 is a diagram illustrating a conventional preamble (PR2) structure of OFDM signals suggested by Minn.

Referring to FIG. 3, in the conventional preamble (PR2) structure of OFDM signals suggested by Minn, the preamble (PR2) includes four sub-preambles such as [$A_{PR2}$, $A_{PR2}$, $-A_{PR2}$, $-A_{PR2}$]. Namely, in the preamble (PR2) of Minn, the same sample stream is repeated at intervals of N/4. In addition, in the preamble (PR2) of Minn, the phases are inverted at internal of N/2. Therefore, the distance between the same samples is equally N/4.

As shown in the arrows B1 and B2 in the FIG. 3, the self-correlation unit (20) calculates the self-correlation value for the same samples between the sub-preamble having the same phase ($A_{PR2}$, $A_{PR2}$) and ($-A_{PR2}$, $-A_{PR2}$), in order to estimate the symbol timing.

Figure 4:
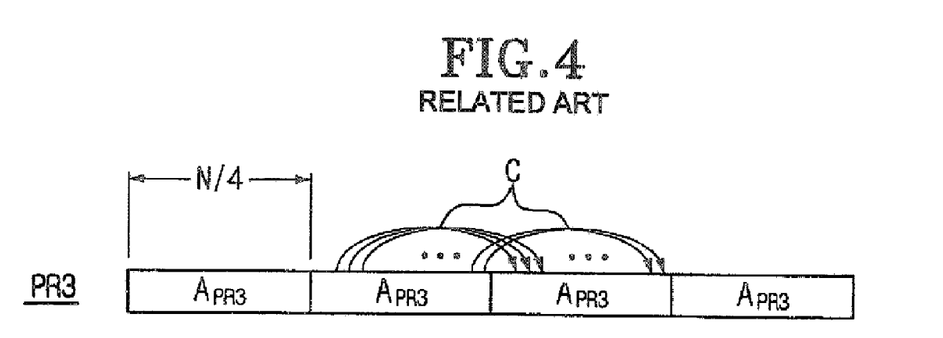
FIG. 4 is a diagram a preamble (PR3) structure of OFDM signals suggested by Morelli in accordance with the conventional method.

FIG. 4 is a diagram illustrating a conventional preamble (PR3) structure of OFDM signals suggested by Morelli.

In the conventional preamble (PR3) structure of OFDM signals suggested by Morelli, the preamble (PR3) includes four sub-preambles such as [$A_{PR3}$, $A_{PR3}$, $A_{PR3}$, $A_{PR3}$]. Every sub-preamble includes the same samples with the length of N/4. Therefore, the distance between the same samples is equally N/4. In order to estimate the frequency offset, indicated in the arrow C of FIG. 4, a N/4 delayed sample and a self-correlation value for each sample are calculated.

As described above, the method for synchronizing symbol and frequency of the OFDM signals using the conventional preamble (PR1) suggested by Schimidle is disadvantageous in some ways. Firstly, the conventional preamble that is used to demodulate the OFDM signals cannot be used in the synchronizing modulation-demodulation method.

Secondly, whenever the signals are offset from the precise symbol starting point, the number of the signals without any correlation becomes equal to the number of offset samples. In this manner, the high error rate around the original symbol starting point results due to the influences of other noises and channels.

Thirdly, since the distance between the same samples is constant N/2 in the process of frequency offset estimation, the coarse frequency offset and the fine frequency offset should be estimated, respectively.

On the other hand, it is available to estimate the symbol timing using the preamble (PR2) of OFDM signals suggested by Minn, but it is impossible to estimate the frequency offset instead. Thus, there is a problem that a separate preamble should be added in order to estimate the frequency offset.

In contrast, it is available to estimate the frequency offset using the preamble (PR3) of OFDM signals suggested by Morelli, but it is impossible to estimate the symbol timing. Thus, there is a problem that a separate preamble should be added in order to estimate the symbol timing.

SUMMARY OF THE INVENTION

Accordingly, it is a primary object of the present invention to provide a method for creating symmetric preamble of OFDM signals to solve the above problem.

Another object of the present invention is to provide a method for synchronizing symbol and frequency of OFDM signals with higher precision in timing synchronization and a fine frequency synchronization of the received OFDM signals.

Still another object of the present invention is to provide a method for synchronizing symbol and frequency of OFDM signals for improving an error rate that usually occurs around the original symbol starting point.

Still another object of the present invention is to provide a method for synchronizing symbol and frequency of OFDM signals for extending a frequency offset estimation range.

Yet another object of the present invention is to provide a method and a preamble for synchronizing symbol and frequency of OFDM signals that enable to estimate symbol timing and frequency offset without adding a separate preamble.

In order to achieve the above-described objects of the present invention, there is provided a preamble for synchronizing symbol and frequency of OFDM signals that forms the symmetric-identical preamble for the calculation of the symbol timing and the frequency offset of the OFDM signals by using the samples that are obtained from the received signals, wherein the symmetric-identical preamble forms a first sample group and a second sample group that are alternately arrayed in several times. Here, in the first sample group, a designated number of samples are arrayed in order of arrival, while the samples in the second sample group are identical with those of the fist sample group but they are arrayed in inverse order of arrival.

The number of samples in the first sample group is N/4, wherein N is the length of the OFDM symbol.

The first sample group and the second sample group are alternately arrayed to each other.

The method for synchronizing symbol and frequency of OFDM signals in accordance with the present invention includes the steps of: (A) receiving OFDM signals with symmetric-identical preamble; (B) converting the received analog OFDM signals to digital signals; (C) separating the symmetric-identical preamble from the received OFDM signals to obtain a symbol synchronism and a frequency synchronism of the OFDM signals; (D) revising a timing synchronism of the received OFDM signals according to a symbol timing offset that is calculated from the separated symmetric-identical preamble; and (E) revising the frequency synchronism of the received OFDM signals based on the frequency offset that is calculated from the separated symmetric-identical preamble.

The step (D) can be accomplished by applying the symmetric-identical preamble to Formula, $$M(d) = \frac{|P(d)|^2}{R^2(d)},$$

in order to obtain a timing metric, and the sample having a maximum timing metric becomes the symbol timing. Here, d is 2M≈N, a time index corresponding to the first sample in a sample window, and M is the sum of the number of samples in the first sample group and the second sample group. P(d) is calculated by a correlation metric, applying Formula, $$P(d) = \sum_{n=0}^{M-1} r^*(n)r(N-1-n).$$

In addition, R(d) is a half energy of the OFDM symbol, and obtained by applying Formula, $$R(d) = \frac{1}{2}\sum_{n=0}^{N-1} |r(d+n)|^2.$$

Preferably, the step (E) includes the steps of: calculating a fine frequency offset using the symmetric-identical preamble based on Formula, $$\hat{\delta}_{fine} = \text{Arg}\left[\sum_{n=0}^{L-1} r^*(n)r(n+M)\right]/\pi;$$

calculating an integral frequency offset using the symmetric-identical preamble based on Formula, $$\hat{\delta}_{coarse} = \frac{N}{2}\sum_{n=0}^{M-1} \frac{\arg(r^*(n)r(N-1-n))}{\pi(N-1-2n)};$$

and compensating a frequency offset of the received OFDM signals in accordance with the sum of the fine frequency offset and the coarse frequency offset.

At this time, the sum of the number of samples in the first sample group and the second sample group should satisfy the pre-designated frequency offset.

According to the present invention, the self-correlation value between the identical samples is noticeably distinct from other correlation coefficients between the identical samples, so that the starting point of the OFDM symbol can be estimated more precisely. Therefore, using the symmetric-identical preamble, both fine frequency offset and coarse frequency offset can be estimated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Suppose the signal to be transmitted to an OFDM transmitter (not shown) is s(k). The input signals going through IFFT (not shown) of the transmitter can be shown as follows:

$$s(n) = \frac{1}{\sqrt{N}} \sum_{k=0}^{N-1} S(k) e^{j\frac{2\pi k n}{N}}, \quad 0 \le k \le N-1 \quad \text{[Mathematical Formula 2]}$$

As the transmitted signals go through multi-path channel, characteristics of the channel and noises thereof are added on the signals.

$$R(n) = \int_{-\infty}^{\infty} h(n-\tau)s(\tau)d\tau + w(n) \quad \text{[Mathematical Formula 3]}$$

wherein, w(n) is channel noise; and h(n−τ) is a response function of channel time domain indicating the characteristics of the channel. The channel noise w(n) was modeled as AWGN.

Taking the frequency offset generated from the receiver into consideration, the received OFDM signal R(n), can be represented as the following formula:

$$R(n) = \frac{1}{\sqrt{N}} \sum_{k=0}^{N-1} S(k)H(k)e^{j2\pi\frac{n(k+\delta)}{N}} + w(n) \quad \text{[Mathematical Formula 4]}$$

wherein, δ is a multiplication of a constant by 1/NT, which is a remodeled frequency offset generated from the receiver; N is the amplitude of FFT; T is a sampling period; and H(k) is a response function of a channel in a frequency domain.

The First Embodiment

Figure 5:
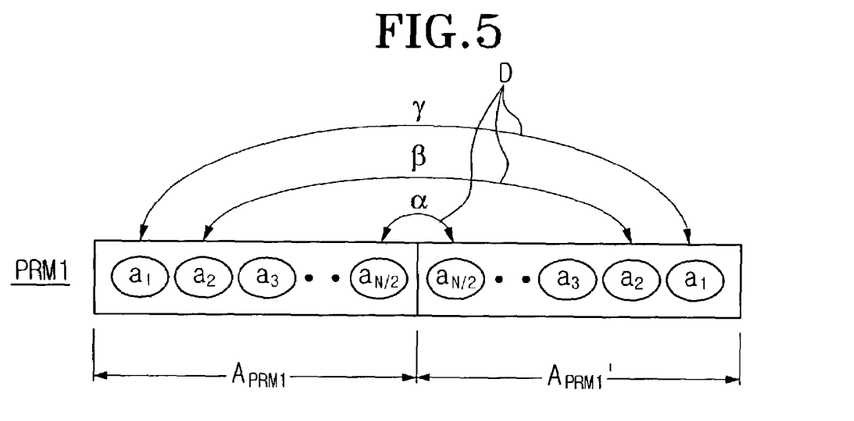
FIG. 5 is a diagram illustrating a structure of symmetric-identical preamble in accordance with a first preferred embodiment of the present invention.

FIG. 5 illustrates a structure of symmetric-identical preamble in accordance with the first preferred embodiment of the present invention.

As shown in FIG. 5, the symmetric-identical preamble (PR1) according to the first embodiment of the present invention includes a first sample sequence ($A_{PRM1}$) and a second sample sequence ($A_{PRM1}'$). Here, the first sample sequence ($A_{PRM1}$) is as long as N/2, and includes {$a_1$, $a_2$, $a_3$, ... $a_{N/2}$}. Also, the second sample sequence ($A_{PRM1}'$) is as long as the first sample sequence, that is, N/2. However, the samples in the second sample sequence ($A_{PRM1}'$) are arrayed inversely to the order of the samples in the first sample sequence ($A_{PRM1}$), namely, {$a_{N/2}$, ... , $a_3$, $a_2$, $a_1$}. The symmetric-identical preamble (PRM1) in the first embodiment of the present invention can be derived in the following formula.

$$\text{PRM1} = [A_{PRM1} A_{PRM1}'] \quad \text{[Mathematical Formula 5]}$$

wherein, $A_{PRM1}$={$a_1$, $a_2$, $a_3$, ... , $a_{N/2}$}; and $A_{PRM1}'$={$a_{N/2}$, ... , $a_3 a_2 a_1$}.

As shown in Formula 5, the preamble (PRM1) of the first embodiment has the identical value, $a_1$, for the first and the Nth samples, and the distance between the two samples is (N−1). In addition, the N/2th sample and the (N/2+1)th sample have the same value, $a_{N/2}$, wherein the distance between the two samples is 1. Thus the distance between the samples, despite of the same value, is different for each sample.

Figure 6:
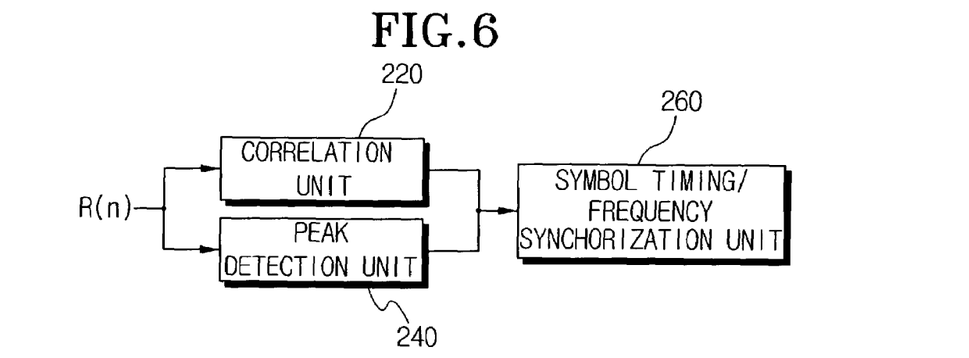
FIG. 6 is a block diagram illustrating a structure of an OFDM signal synchronism detector in accordance with the present invention.
Figure 7:
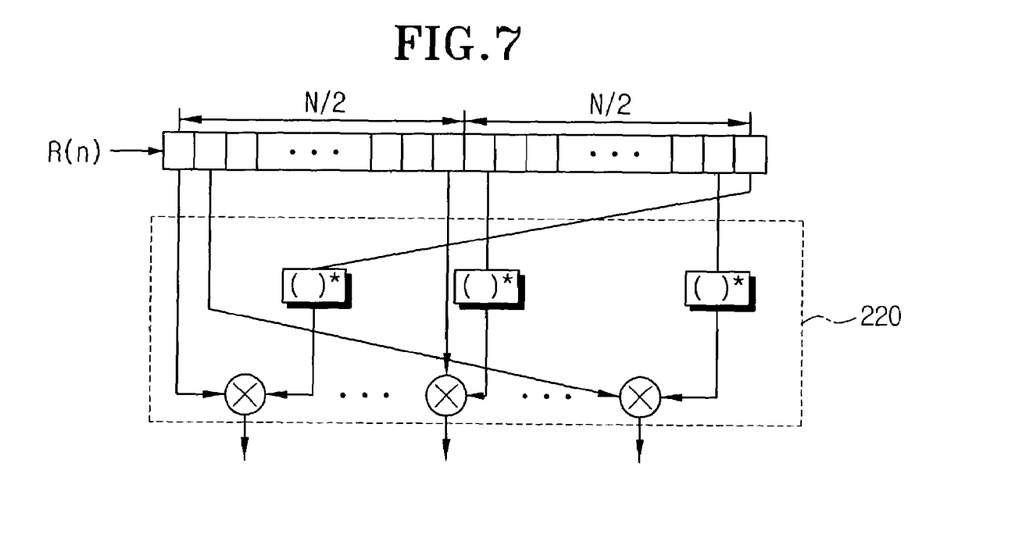
FIG. 7 is a diagram illustration detailed operations of a correlation unit shown in FIG. 6.
Figure 8:
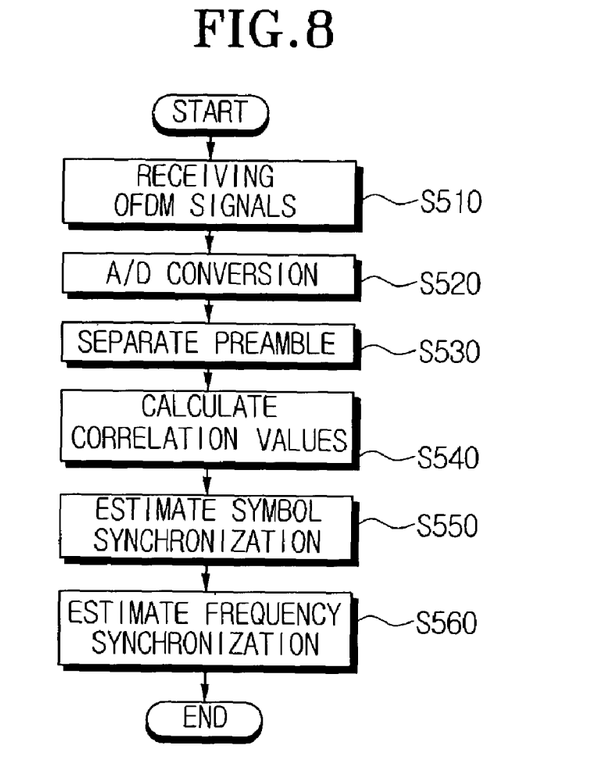
FIG. 8 is a flow chart illustrating a method for synchronizing symbol and frequency of OFDM signals in accordance with the present invention.

FIG. 6 is a block diagram illustrating an OFDM signal synchronism detector in accordance with the present invention. FIG. 7 is a diagram explaining the operations of a correlation unit shown in FIG. 6 in more detail. FIG. 8 is a flow chart illustrating a method for detecting OFDM signal synchronism in accordance with the present invention.

With reference to FIG. 8, the OFDM receiving system (not shown) receives OFDM signals R(n) through a RF(radio frequency) receiver(S510). It is supposed that the received OFDM signals R(n) include the symmetric-identical preamble (PRM1).

The received OFDM signal R(n) is converted from the analog signal to the digital signal (S520). Then, the OFDM receiving system separates the symmetric-identical preamble (PRM1) from the received OFDM signals R(n) (S530).

The OFDM signal synchronism detector of the present invention detects a symbol timing synchronization and a frequency synchronization by using the preamble (PRM1) that are separated from the OFDM signals R(n) in accordance with the first embodiment described above. The OFDM signal synchronization detector includes a correlation unit 220, a peak detection unit 240 and a symbol timing and frequency synchronization unit 260.

As shown in FIG. 7, the correlation unit (220), applying Formula 6, calculates a self-correlation value between the identical samples in the symmetric-identical preamble (PRM1) that have been separated from the received OFDM signals, R(n) (S540). Afterwards, the calculated self-correlation value is outputted to the symbol timing and frequency synchronization unit 260.

$$P(d) = \sum_{n=0}^{N/2-1} r^*(n)r(N-1-n) \quad \text{[Mathematical Formula 6]}$$

wherein, d is a time index corresponding to the first sample of a window having N/2 samples.

Figure 9:
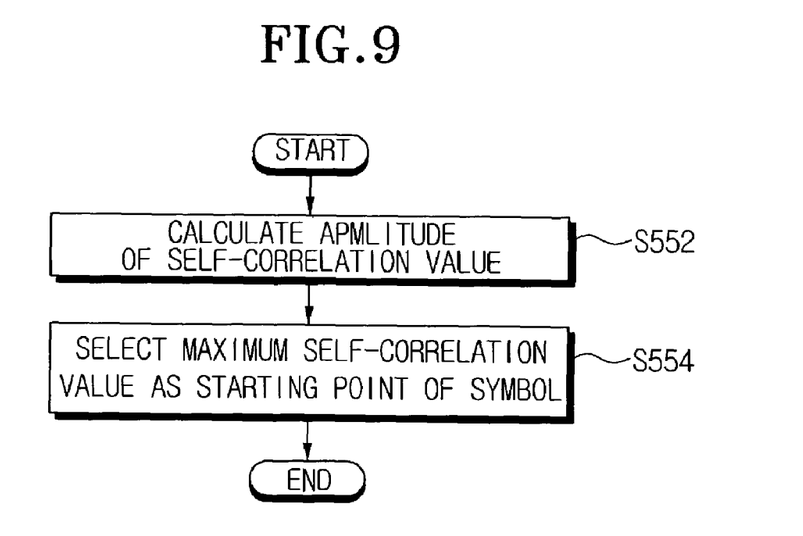
FIG. 9 is a flow chart illustrating detailed procedures of symbol synchronism estimation of FIG. 8 in accordance with the present invention.

FIG. 9 is a flow chart illustrating detailed procedures of symbol synchronization estimation step of FIG. 8 (S550).

As shown in FIG. 9, the peak detection unit 240 obtains the amplitude of the self-correlation value that has been calculated previously (S55). Also, the peak detection unit (240) detects the sample n with the maximum correlation value as the starting point of the symbol (S554). As explained before, the symbol starting point, $S_{start}$, of the calculated OFDM signals, R(n), can be derived as follows.

$$S_{start} = \max_n \left| \sum_{n=0}^{N/2-1} r^*(n)r(N-1-n) \right| \quad \text{[Mathematical Formula 7]}$$

The symbol timing and frequency synchronization unit 260, first of all, estimate the symbol timing of the received OFDM signals, R(n), based on the staring point $S_{start}$ of the symbol which is detected by the peak detection unit 240.

Here, the symbol staring point $S_{start}$ is used as a basis for finding the fine frequency offset more precisely. The location of the detected symbol starting point, $S_{start}$ is verified using the following formula.

$$E\{P_{proposed}(0)\} = \frac{N}{2} \quad \text{[Mathematical Formula 8]}$$

$$E\{P_{proposed}(d)\} = 0 \quad \text{[Mathematical Formula 9]}$$

wherein, d is an integral without including zero, indicating the number of the off-samples. Here, even though a single sample is off, the calculated result of the correlation value becomes zero. It is because there is no correlation between the signal elements to be multiplied. Similarly, a very small correlation value is obtained because there is no correlation between the AWGN and the transmitted signals even if the AWGN is added upon the received signals.

On the other hand, the symbol timing and frequency synchronization unit 260 estimates a frequency offset to obtain the frequency synchronization of the OFDM signals (S560). In the step of estimating the frequency offset (S560), a phase value is calculated by using the correlation values of the identical samples in the preamble (PRM1) according to the first embodiment aforementioned. Using the phase value obtained and the distance between the identical samples, the frequency offset between the identical samples is obtained. Also, the frequency offset between the identical samples is used to estimate the frequency of the OFDM signals. Here, the frequency offset is calculated by applying the following formula.

$$\hat{\delta} = \frac{N}{2} \sum_{n=0}^{N/2-1} \frac{\arg(R(n)R^*(N-1-n))}{\pi(N-1-2n)}$$ [Mathematical Formula 10]

wherein, $\hat{\delta}$ is an estimated value of offset; and N is the length of a symbol. In other words, the estimated value of offset is obtained like the following process. Each correlation values are firstly divided by the distance between the samples, added by N/2 samples, and finally divided by N/2.

Interestingly enough, as for the frequency offset estimation, the estimable range of the frequency offset varies depending on the distance of two samples. In general, it is impossible to estimate the fine frequency offset using the correlation coefficient of two samples especially based on GIB, in which the calculation of each correlation coefficient is not divided by the distance between the samples. However, if the two samples get closer to each other, the range of the frequency offset is consequently broadened, and even the coarse frequency offset can be estimated. In the case of calculating the correlation value, the distance between the two samples is the shortest when the difference between of the samples is just one sample. Actually, the symmetric-identical preamble (PRM1) according to the first embodiment satisfies the condition aforementioned. Thus if the correlation value with a relatively short distance between the samples are used, not only the fine frequency offset, but also the coarse frequency offset can be estimated. In other words, the estimation range of the frequency offset is extended.

However, the extended estimation range may lower the precision. By applying different weights depending on the distance between the identical samples that compose the symbol, the frequency offset can be estimated. Referring to FIG. 5, let the distance α between the N/2th sample and the (N/2+1)th sample be 1. Then, the distance β between the second sample and the (N−1)th sample becomes (N−3), and the distance γ between the first sample and the Nth sample becomes (N−1), respectively. That is to say, each distance between the identical samples is different.

At this time, the weight can be adjusted to be increased, as the distance between the samples gets larger. For example, the weight can be increased exponentially as the distance between the samples gets longer. Also, the weight can be increased integrally as the distance of the samples gets longer.

Figure 10:
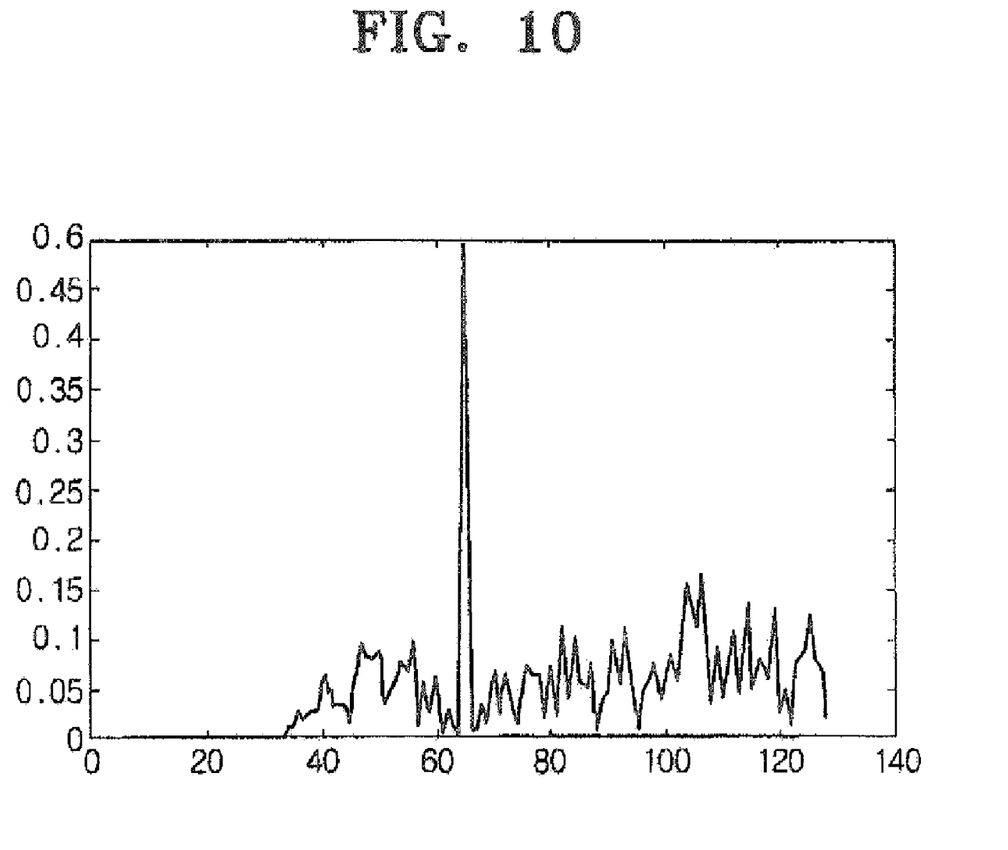
FIG. 10 is a graph illustrating correlation coefficients using the preamble of FIG. 6.

FIG. 10 illustrates the correlation values using the symmetric-identical preamble proposed in the present invention, under the conditions that the number of sub-carriers is 64, and the experiment is performed in AWGN environment at 5 dB. In the method for synchronizing symbol timing and frequency using the symmetric-identical preamble, the correlation is lost even when a single sample off the original symbol staring point, which consequently results in a very small correlation value in other samples beside the 64 samples used.

Moreover, the sample stream of the preamble employed in the first embodiment of the present invention can be symmetrically structured with the length smaller than N/2n. Here, n is an integral over 2. That is, if n=2, the preamble (PRM1) according to the first embodiment of the present invention are $A_{PRM1}=\{a_1, a_2, a_3, \ldots, a_{N/4}\}$, and $A_{PRM1}'=\{a_{N/4}, \ldots, a_3, a_2, a_1\}$. Therefore, there is an effect that the number of the preamble decreases and the symbol timing and frequency offset can be estimated.

The Second Embodiment

Figure 11:
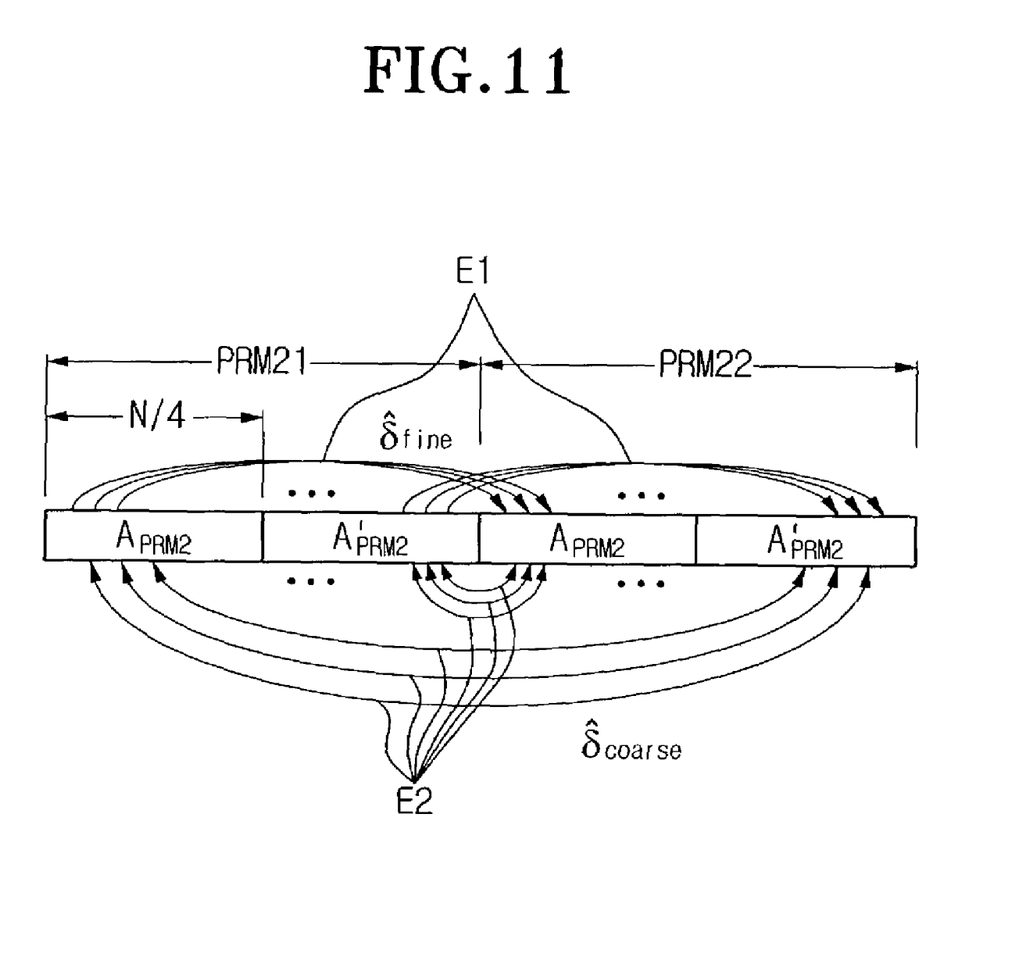
FIG. 11 is a diagram illustrating a structure of symmetric-identical preamble in accordance with a second preferred embodiment of the present invention.

FIG. 11 illustrates a structure of symmetric-identical preamble (PRM1) in accordance with the second embodiment of the present invention.

As shown in FIG. 11, the symmetric-identical preamble according to the second embodiment of the present invention includes the first sample group ($A_{PRM2}$) and the second sample group ($A'_{PRM2}$), which are arrayed alternately two times. Here, the first sample group ($A_{PRM2}$) is as long as N/4. and it includes $\{b_1, b_2, b_3, \ldots, b_{N/4}\}$. In other words, in the first sample group ($A_{PRM2}$), N/4 samples are arrayed in the received order. Meanwhile, the second sample group ($A'_{PRM2}$) is as long as N/4, and includes $\{b_{N/4}, \ldots, b_3, b_2, b_1\}$. Namely, the sample in the second sample group ($A'_{PRM2}$) are as many as those of the first sample group ($A_{PRM2}$) and have the same values. The samples in the second sample group ($A'_{PRM2}$) are arrayed in the order inverse to the received order. The symmetric-identical preamble according to the second embodiment of the present invention can be expressed as follows.

PRM2=[$A_{PRM2}A'_{PRM2}A_{PRM2}A'_{PRM2}$] [Mathematical Formula 11]

wherein, $A_{PRM2}=\{b_1, b_2, b_3, \ldots, b_{N/4}\}$, and $A'_{PRM2}=\{b_{N/4}, \ldots, b_3, b_2, b_1\}$. That is $A_{PRM2}$ is the sample with the length of N/4, created by converting data of pseudo noise sequence to QPSK, and by applying N/4 points IFFT. In addition, a sudden amplitude change owing to the inverse conversion of the preamble can be avoided by amending PN sequence.

The method for estimating symbol timing by using the preamble (PRM2) according to the second embodiment of the present invention will be explained below.

The peak detection of correlation values for the use of symbol timing can be calculated by employing two symmetric parts. As for the symmetric-identical preamble according to the second embodiment aforementioned, the estimation of the symbol timing in accordance with the second embodiment uses the first half sample group (PRM21) and the second half sample group (PRM22) as shown in FIG. 11. The first half sample group and the second half sample group consists of [$A_{PRM2}A'_{PRM2}$], respectively, and the length of each group is N/2.

That is to say, for finding the symbol timing synchronization, the timing metric between the identical samples in the first sample group and the second half sample group (PRM21, PRM22) indicated as the arrow E1 in FIG. 11 can be calculated by applying the following formula 12. The symbol starting point is a maximum value of timing metric.

$$M(d) = \frac{|P(d)|^2}{R^2(d)} \qquad \text{[Mathematical Formula 12]}$$

wherein, d is a time index corresponding to the first sample in the sample window 2M≈N; M is the sum of the number of samples in the first sample group ($A_{PRM2}$) and the second sample group ($A'_{PRM2}$); and P(d) is a correlation metric, which is derived from Formula 13.

$$P(d) = \sum_{n=0}^{M-1} r^*(n)r(N-1-n) \qquad \text{[Mathematical Formula 13]}$$

wherein, ( )* indicates a conjugation.

R(d) in Formula 12 is an energy corresponding to a half of the OFDM symbol. The R(d) is for normalizing the correlation metric against any big change in the OFDM sample size, and can be derived from the following.

$$R(d) = \frac{1}{2}\sum_{n=0}^{N-1} |r(d+n)|^2 \qquad \text{[Mathematical Formula 14]}$$

It is of course that the Formula 13 and the Formula 14 can be calculated repeatedly.

Next, a method for estimating the frequency offset by using the symmetric-identical preamble (PRM2) according to the second embodiment of the present invention is explained below.

Due to frequency offset of the carrier wave, phase differences occurred among the samples in the first half sample group (PRM21) and the second half sample group (PRN22) in the receiver. In order to compensate the phase difference, the frequency offset estimation method is carried out in two steps.

To begin with, an estimable maximum frequency offset on M≈N/2 is ±1 of the sub-carrier spacing. Hence, in the first step, the fine frequency is estimated. As shown the arrow E1 in FIG. 11, the fine frequency offset ($\hat{\delta}_{fine}$) can be derived from Formula 15.

$$\hat{\delta}_{fine} = \text{Arg}\left[\sum_{n=0}^{L-1} r^*(n)r(n+M)\right] / \pi \qquad \text{[Mathematical Formula 15]}$$

FFT starting point is set to the point at d=0 as in Formula 14. Usually, the samples in the first half sample group and the second half sample group are used to estimate the fine frequency offset. In such case, it is possible to obtain the comparable result with that of the conventional method by Schimidle. Accordingly, the fine frequency offset of ±1 the sub-carrier spacing, is removed from the received signals, r(n), by the estimated fine frequency offset ($\hat{\delta}_{fine}$) derived from Formula 15.

The second step involves the coarse frequency estimation using the symmetry characteristic of SI preamble. The coarse frequency offset ($\hat{\delta}_{coarse}$) is derived from Formula 16.

$$\hat{\delta}_{coarse} = \frac{N}{2}\sum_{n=0}^{M-1} \frac{\arg(r^*(n)r(N-1-n))}{\pi(N-1-2n)} \qquad \text{[Mathematical Formula 16]}$$

Here, the measurable frequency offset is changed within the interval range of the identical samples, meaning that the measurable maximum frequency offset is ±1 or greater than the interval between the sub-carriers, and is in the range of offset value allowable in the system.

Of course, M in Formula 16 can be adjusted to meet the offset range allowable in the system. In other words, since it is possible to change the number of samples of preamble necessary for calculation of the coarse frequency, a great deal of calculation is reduced. Here, if the coarse frequency offset ($\hat{\delta}_{coarse}$) is within an allowable error of the system, it can be disregarded.

Because the fine frequency offset that is smaller than ±1 of the interval of sub-carriers, is already compensated in the first step, it is very easy to find the remaining frequency offsets with greater than the interval of the sub-carriers, e.g., ±2. In addition, the coarse frequency offset can be estimated to be a multiple of ±2 of the interval of the sub-carriers. The procedure of estimating the coarse frequency offset is illustrated as the arrow E2 in FIG. 11.

Consequently, the total frequency offset ($\hat{\delta}_{total}$) is derived from Formula 17.

$$\hat{\delta}_{total} = \hat{\delta}_{fine} + \hat{\delta}_{coarse} \qquad \text{[Mathematical Formula 17]}$$

Figure 12:
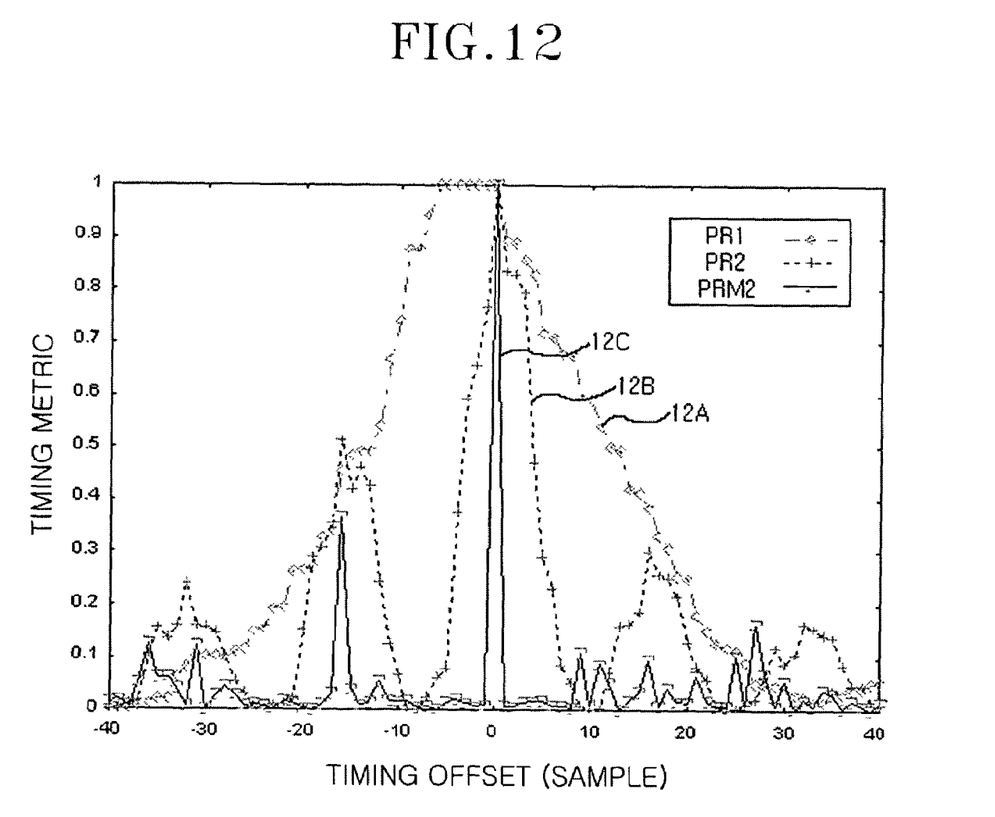
FIG. 12 is a graph illustrating a timing metric according to a timing offset when the preamble shown in FIGS. 2, 3 and 11 are applied.

FIG. 12 is a graph illustrating timing metric corresponding to each preamble according to the second embodiment of the present invention and the conventional art. If the timing offset is zero and timing metric has a maximum metric value, the timing offset estimation performance is considered excellent.

Referring to FIG. 12, the graph 12A illustrates a case where the preamble (PR1) suggested by Schimidle is used. In the FIG. 12, there is shown plateau inherent which the plurality of peaks of the timing metric exist in the range in which the timing offset is in the interval of −5 through 0. Also, the timing metric value does not become zero in other timing offset intervals besides the −5 through 0 interval. Hence, the preamble (PR1) of Schimidle is not appropriate for finding a precise timing offset.

With reference to FIG. 12, particularly the graph 12B illustrates a case where the preamble (PR1) suggested by Minn is used. In such case, the timing metric value is the highest when the timing offset is around zero. Nevertheless, because the timing metric value is very close to the peak value even within the timing offset between 0 and 5, the timing metric can be detected within the timing offset ranging from 1 through 5. It tells that it is more effective to use the preamble (PR1) proposed by Minn than the preamble (PR1) proposed by Schimidle in detecting precise symbol timing.

In the meantime, the graph 12C illustrates a case where the preamble (PR2) according to the second embodiment of the present invention are used. In such case, the timing metric has a maximum value only when the timing offset is zero. Also, the timing metric is zero when the timing offset is around zero.

Accordingly, if the symmetric-identical preamble (PRM2) in accordance with the second embodiment of the present invention is used, the plateau inherent characteristic that has been observed in the case of using the preamble (PR1) suggested by Schimidle can be removed. Moreover, the slope of the timing metric between an accurate timing point and an inaccurate timing point is steeper when the preamble (PRM2) according to the second embodiment of the present invention are used than those of Schimidle or Minn, i.e., (PR1, PR2). Thus, if the preamble (PRM2) according to the second embodiment of the present invention is used, it has a good effect to estimate a more precise timing offset.

Figure 13:
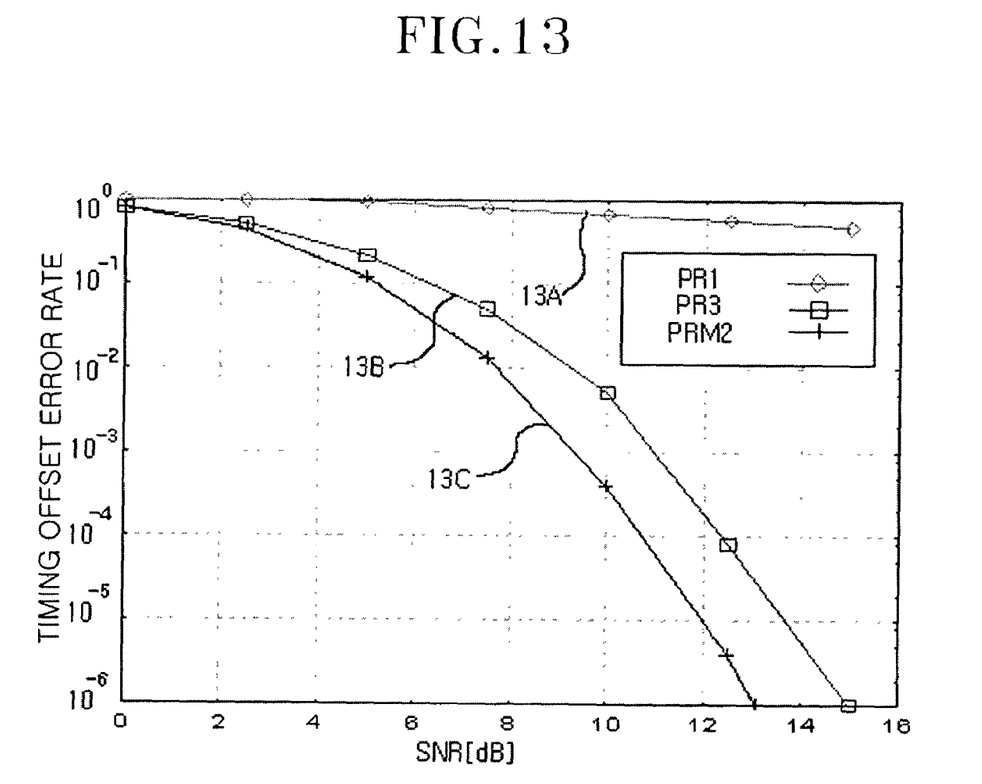
FIG. 13 is a graph illustrating a timing error rate on each SNR when the preamble shown in FIGS. 2, 4 and 11 are applied.

FIG. 13 is a graph illustrating a timing offset error rate against SNR when the preamble shown in FIGS. 2, 3 and 11 are employed. Especially, the graph 13A in FIG. 13, indicated as "◊" on a straight line, shows the timing offset error rate against SNR when the conventional preamble (PR1) suggested by Schimidle are used. On the other hand, the graph 13B, indicated as "◊" on a straight line, shows the timing offset error rate against SNR when the conventional preamble (PR3) suggested by Morelli are used. The graph 13C, indicated as "+" on a straight line, illustrates a case in which the symmetric-identical preamble (PRM2) according to the second embodiment of the present invention are used.

When the conventional preamble (PR1) suggested by Schimidle are used, although it might increase SNR, the timing offset error rate was nearly fluctuated didn't show a big difference in a range from $10^0$ to $10^{-1}$. On the other hand, when the preamble (PR3) suggested by Morelli is used, the timing offset error rate was noticeably reduced as the SNR got increased in the same range of from $10^0$ to $10^{-6}$. Also, it was observed that if the SNR was greater than 15 dB, the timing offset error rate was reduced down to $10^{-6}$.

However, when the symmetric-identical preamble (PRM2) according to the present invention, the timing offset error rate, under the same SNR conditions as above, was remarkably low, compared with the cases of using the preamble (PR1) or the preamble (PR3). For example, if the SNR is greater than 13 dB, the timing offset error rate is reduced to $10^{-6}$. Therefore, the symmetric-identical preamble (PRM2) of the present invention is more advantages than the preamble suggested by Morelli by the gain of 2 dB.

Figure 14:
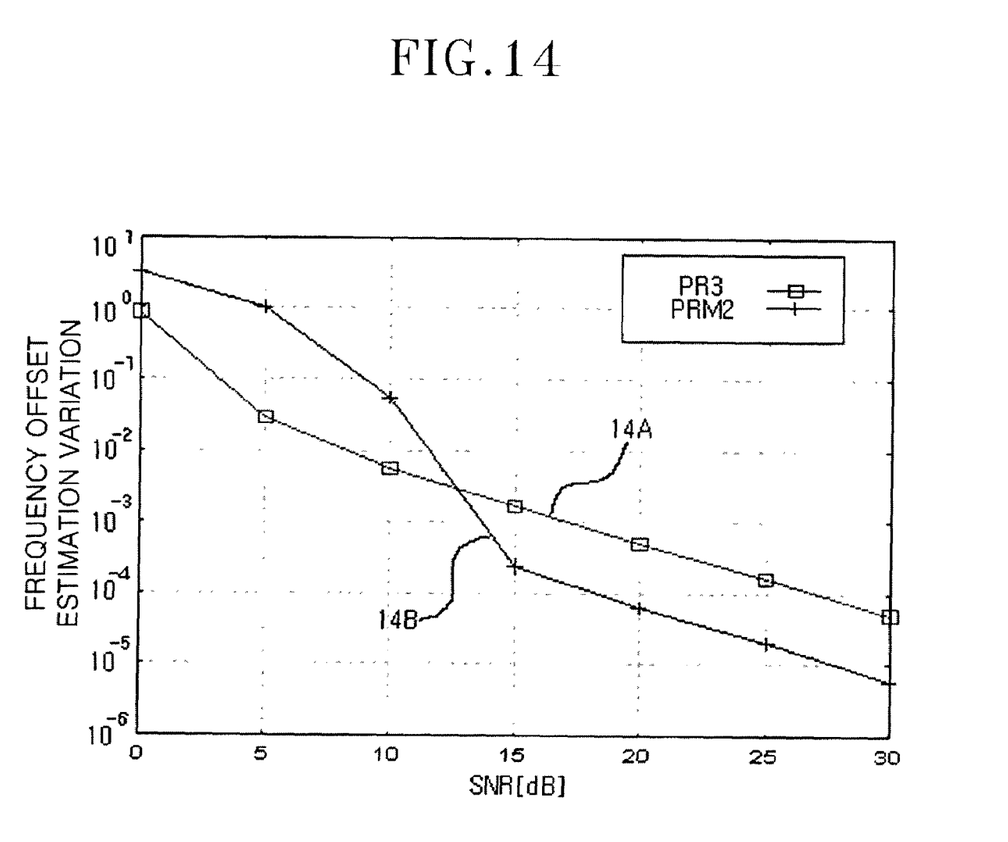
FIG. 14 is a graph illustrating a frequency estimation variation according to SNR when the preamble shown in FIGS. 4 and 11 are applied.

FIG. 14 is a graph illustrating a frequency offset estimation variation according to SNR when the preamble (PRM2) of the second embodiment of the present invention and the preamble (PR3) suggested by Morelli are used.

With reference to FIG. 14, the graph 14A, indicated as "□" on a straight line, shows the frequency offset estimation variation to SNR using the preamble (PR3) suggested by Morelli. Meanwhile, the graph 14B, indicated as "+" on a straight line, shows the frequency offset estimation variation to SNR using the preamble (PRM2) according to the second embodiment of the present invention.

As shown in FIG. 14, if the preamble (PRM2) of the present invention is used, a maximum frequency offset estimation variation is less than $10^{-4}$, particularly when the SNR is over 15 dB. On the other hand, if the preamble (PR3) suggested by Morelli are used, a maximum frequency offset estimation variation is less than $10^{-3}$, under the same condition as above, that is, when the SNR is over 15 dB. From the results, it is observed that the preamble (PRM2) according to the second embodiment of the present invention are superior to those illustrated above.

Figure 15:
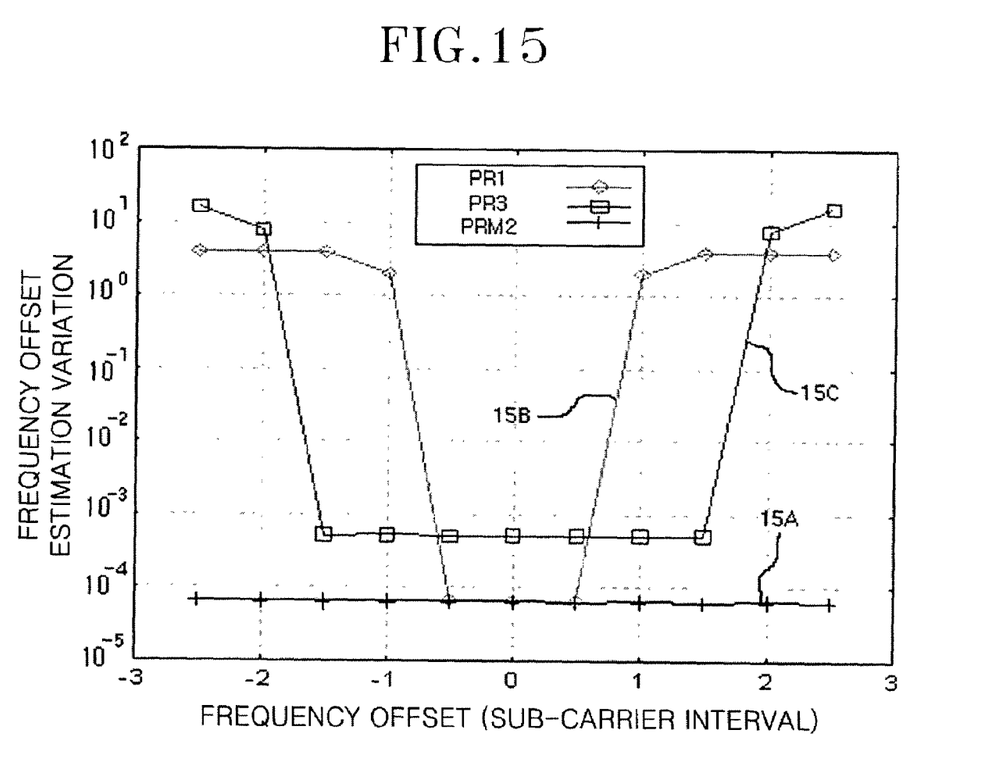
FIG. 15 is a graph illustration a frequency estimation variation according to frequency offset when the preamble shown in FIGS. 2, 4 and 11 are applied.

FIG. 15 is a graph illustrating a frequency offset estimation variation according to the frequency offsets when the preamble (PR1) of Schimidle, the preamble (PR3) of Morelli, and the preamble (PRM2) of the second embodiment of the present invention are used, respectively.

The graph 15A, indicated as "+" on a straight line, shows the frequency offset estimation variation according to the frequency offset using the preamble (PR3) suggested of the second embodiment of the present invention. Meanwhile, the graph 15B, indicated as "◊" on a straight line, shows the frequency offset estimation variation according to the frequency offset using the preamble (PR3) suggested by Morelli. And, lastly, the graph 15C, indicated as "□" on a straight line, shows the frequency offset estimation variation according to the frequency offset using the preamble (PR1) suggested by Schimidle.

As shown in FIG. 15, when the symmetric-identical preamble (PRM2) according to the present invention is used, a maximum frequency offset estimation variation for all frequency offsets is less than $10^{-4}$.

When the frequency offset is estimated by using the preamble (PR1) suggested by Schimidle, particularly, when the frequency offset is ±0.5 the sub-carrier spacing, a maximum frequency offset estimation variation is less than $10^{-4}$, similar to the case of using the preamble of the present invention. However, if the frequency offset is greater than ±0.5 the sub-carrier spacing, the frequency offset estimation variation increases remarkably. Especially when the frequency offset is about ±1 the sub-carrier spacing, the frequency offset estimation variation becomes $10^0$ or greater than 1, deteriorating the overall performance.

In addition, if the frequency offset is estimated using the preamble (PR3) suggested by Morelli, a minimum frequency offset variation reaches almost $10^{-3}$.

In conclusion, the method for synchronizing symbol and frequency of the OFDM signals has a number of advantages as follows:

First of all, it is now possible to synchronize symbol and frequency of the OFDM signals by improving the precision of a timing synchronism of the received OFDM signals that passed through a multi-path channel causing noises and distorting amplitudes and phases of the signals, and by improving the precision of a fine frequency synchronization. Secondly, the symmetric-identical preamble is applicable to the asynchronous modulation-demodulation system as well as the synchronous modulation-demodulation system. Thirdly, the error rate that often occurs around the original symbol starting point is greatly improved. Lastly, the frequency offset estimation range is extended.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for synchronizing symbol and frequency of Orthogonal Frequency Division Multiplexed (OFDM) signals, the method comprising the steps of:

receiving the OFDM signals having a symmetric-identical preamble comprising a first sample group and a second sample group alternately arrayed a plurality of times, wherein the first sample group comprises a designated number of the samples arrayed in order of arrival and the second sample group comprises a same number of the samples as the first sample group, arrayed in inverse order of arrival;

converting the OFDM signals from analog to digital signals;

separating the symmetric-identical preamble from the received OFDM signals to obtain a symbol timing synchronism and a frequency synchronism of the OFDM signals;

revising the symbol timing synchronism of the received OFDM signals according to a symbol timing offset that is calculated from the separated symmetric-identical preamble; and revising the frequency synchronism of the received OFDM signals based on a frequency offset that is calculated from the separated symmetric-identical preamble;

wherein in the revising step of the symbol timing synchronism, a timing metric is determined from a mathematical formula by using the symmetric-identical preamble, and a maximum timing metric is selected to be a symbol timing, the first mathematical formula being:

$$M(d) = \frac{|P(d)|^2}{R^2(d)}$$

wherein, d is 2M≈N, a time index corresponding to a first sample of a sample window; M is a sum of a number of samples in a first sample group and a second sample group; P(d) is a correlation metric, and is determined from a second mathematical formula:

$$P(d) = \sum_{n=0}^{M-1} r^*(n)r(N-1-n)$$

where n is an integral; N is the length of a symbol, r is a second sample which arrives at a receiving system in a time domain, and R(d) is an energy corresponding to a half of an OFDM symbol, being determined from a third mathematical formula:

$$R(d) = \frac{1}{2}\sum_{n=0}^{N-1} |r(d+n)|^2.$$

2. The method of claim 1, wherein the designated number of samples in the first sample group is N4, N being a length of an OFDM symbol.

3. The method of claim 1, wherein the first sample group and the second sample group are alternately arrayed two times.

4. The method of claim 1, wherein a sum of the first sample group and the second sample group is selected to satisfy a pre-designated frequency offset.

5. A method for synchronizing symbol and frequency of Orthogonal Frequency Division Multiplexed (OFDM) signals, the method comprising the steps of:

receiving the OFDM signals having a symmetric-identical preamble comprising a first sample group and a second sample group alternately arrayed a plurality of times, wherein the first sample group comprises a designated number of the samples arrayed in order of arrival and the second sample group comprises a same number of the samples as the first sample group, arrayed in inverse order of arrival;

converting the OFDM signals from analog to digital signals;

separating the symmetric-identical preamble from the received OFDM signals to obtain a symbol timing synchronism and a frequency synchronism of the OFDM signals;

revising the symbol timing synchronism of the received OFDM signals according to a symbol timing offset that is calculated from the separated symmetric-identical preamble; and revising the frequency synchronism of the received OFDM signals based on a frequency offset that is calculated from the separated symmetric-identical preamble, wherein the step of revising the frequency synchronism comprises the sub-steps of:

calculating a fine frequency offset, $\hat{\delta}_{fine}$, based on a fourth mathematical formula by using the symmetric-identical preamble;

calculating a coarse frequency offset, $\hat{\delta}_{coarse}$, based on a fifth mathematical formula by using the symmetric-identical preamble; and compensating the frequency offset of the received OFDM signals according to a sum of the fine frequency offset and the coarse frequency offset, wherein the fourth mathematical formula is:

$$\hat{\delta}_{fine} = \text{Arg}\left[\sum_{n=0}^{L-1} r^*(n)r(n+M)\right]\bigg/\pi,$$

and the fifth mathematical formula is:

$$\hat{\delta}_{coarse} = \frac{N}{2}\sum_{n=0}^{M-1} \frac{\arg(r^*(n)r(N-1-n))}{\pi(N-1-2n)}$$

where n is an integral, N is the length of a symbol, M is a sum of a number of samples in a first sample group and a second sample group, r is a sample which arrives at a receiving system in a time domain, and L is a length of N/2.

* * * * *